(12) United States Patent
Nouwen et al.

(10) Patent No.: US 11,435,033 B2
(45) Date of Patent: Sep. 6, 2022

(54) COMPOSITE PRESSURE VESSEL WITH REINFORCED INNER LINER AND PROCESS FOR THE PRODUCTION THEREOF

(71) Applicant: Plastic Omnium Advanced Innovation and Research, Brussels (BE)

(72) Inventors: Geert Nouwen, Alken (BE); Philippe Willems, Hasselt (BE); Axel Seifert, Zonhoven (BE)

(73) Assignee: Plastic Omnium New Energies, Lyons (FR)

( * ) Notice: Subject to any disclaimer, the term of this patent is extended or adjusted under 35 U.S.C. 154(b) by 0 days.

(21) Appl. No.: 17/054,719

(22) PCT Filed: Jun. 26, 2019

(86) PCT No.: PCT/EP2019/067065
§ 371 (c)(1),
(2) Date: Nov. 11, 2020

(87) PCT Pub. No.: WO2020/002462
PCT Pub. Date: Jan. 2, 2020

(65) Prior Publication Data
US 2021/0247025 A1  Aug. 12, 2021

(30) Foreign Application Priority Data
Jun. 26, 2018 (EP) .................... 18179940

(51) Int. Cl.
*F17C 1/06*  (2006.01)
*F17C 1/16*  (2006.01)
(Continued)

(52) U.S. Cl.
CPC .............. *F17C 1/06* (2013.01); *F17C 1/16* (2013.01); *B29C 70/16* (2013.01); *B29C 70/30* (2013.01);
(Continued)

(58) Field of Classification Search
CPC ............... F17C 1/06; F17C 2203/0604; F17C 2203/0673; F17C 2203/0675; B32B 1/08;
(Continued)

(56) References Cited

U.S. PATENT DOCUMENTS 6,190,481 B1    2/2001  Iida et al.
2004/0206762 A1* 10/2004  Iida ......................... F17C 1/16
                                                        220/581
(Continued)

FOREIGN PATENT DOCUMENTS

CN    1490150 A    4/2004
CN    108372667 A   8/2018
(Continued)

OTHER PUBLICATIONS

Espacenet Translation of WO2016135260A1 (Year: 2021).*
(Continued)

*Primary Examiner* — Michael Zhang
(74) *Attorney, Agent, or Firm* — Oblon, McClelland, Maier & Neustadt, L.L.P.

(57) ABSTRACT

A composite pressure vessel includes: a body including an inner liner which includes a cylindrical portion extending along a longitudinal axis, and which is made of a thermoplastic polymer material; and an outer thermoset reinforcing structure wrapped around the body and made of a continuous fiber reinforced thermoset matrix composite, including reinforcing fibers and a thermoset matrix. The body further includes a thermoplastic reinforcement layer made of a continuous fiber reinforced thermoplastic composite, including reinforcing fiber and a thermoplastic matrix, which is adhered to the cylindrical portion of the inner liner.

21 Claims, 7 Drawing Sheets

(51) Int. Cl.
- *B29C 70/16* (2006.01)
- *B29C 70/30* (2006.01)
- *B29L 31/00* (2006.01)
- *B32B 1/08* (2006.01)
- *B32B 5/02* (2006.01)
- *B32B 5/12* (2006.01)
- *B32B 27/12* (2006.01)

(52) U.S. Cl.
CPC .......... *B29L 2031/7156* (2013.01); *B29L 2031/7172* (2013.01); *B32B 1/08* (2013.01); *B32B 5/024* (2013.01); *B32B 5/12* (2013.01); *B32B 27/12* (2013.01); *B32B 2260/023* (2013.01); *B32B 2260/046* (2013.01); *B32B 2439/40* (2013.01); *F17C 2201/0109* (2013.01); *F17C 2203/0604* (2013.01); *F17C 2203/066* (2013.01); *F17C 2203/0673* (2013.01); *F17C 2203/0675* (2013.01); *F17C 2223/0123* (2013.01)

(58) Field of Classification Search
CPC  B32B 5/024; B32B 5/12; B32B 27/12; B32B 2260/023; B32B 2260/046; B32B 2439/40
See application file for complete search history.

(56) References Cited

U.S. PATENT DOCUMENTS

| | | |
|---|---|---|
| 2006/0257576 A1 | 11/2006 | Santo |
| 2011/0204063 A1 | 8/2011 | Breuer et al. |
| 2017/0104227 A1 | 4/2017 | Otsubo |

FOREIGN PATENT DOCUMENTS

| | | | |
|---|---|---|---|
| EP | 0 810 081 A1 | 12/1997 | |
| JP | 2017-110669 A | 6/2017 | |
| KR | 10-1371593 B1 | 3/2014 | |
| WO | WO-2016135260 A1 * | 9/2016 | ............... F17C 1/16 |
| WO | WO 2018/007367 A1 | 1/2018 | |

OTHER PUBLICATIONS

International Search Report dated Oct. 7, 2019 in PCT/EP2019/067065 filed on Jun. 26, 2019.

Office Action dated Apr. 14, 2021 in corresponding Korean Patent Application No. 10-2020-7035438 (with English Translation), 17 pages

* cited by examiner

COMPOSITE PRESSURE VESSEL WITH REINFORCED INNER LINER AND PROCESS FOR THE PRODUCTION THEREOF

TECHNICAL FIELD

The present invention concerns composite pressure vessels of the type comprising an inner liner made of unreinforced polymer and forming an inner cavity, enclosed in a fibre reinforced polymer shell commonly used as compressed natural gas (CNG) tanks, compressed hydrogen gas (CHG) tanks, liquefied petroleum gas (LPG) tanks, and the like. In particular, the composite pressure vessels of the present invention are particularly resistant to delamination of the inner liner from the composite shell upon a sudden drop of pressure in the inner cavity (such a phenomenon is also called "buckling").

BACKGROUND OF THE INVENTION

Composite pressure vessels for storing a fluid at high pressure are advantageous for their light weight over metal pressure vessels, in particular in case the vessels are mobile, such as pressure vessels for storing a compressed fluid as fuel in the field of transportation (automotive, aerospace, railway, and the like). A composite pressure vessel typically comprises an inner liner made of a (unreinforced) thermoplastic polymer, e.g., PA or HDPE. The inner liner defines an inner cavity and generally comprises a substantially cylindrical portion extending along a longitudinal axis, X1, flanked on either side by a dome shaped cap closing the inner cavity. At least one opening equipped with corresponding connectors is provided for injecting and extracting a pressurized fluid into and out of the inner cavity. To stiffen the structure and make it resistant to the high pressure inside the inner cavity when the pressure vessel is filled with a pressurized fluid, the inner liner is enclosed in a continuous fibre reinforced composite laminate forming an outer thermoset reinforcing structure. An example of composite pressure vessel is described e.g., in WO2018007367.

Figure 1A:
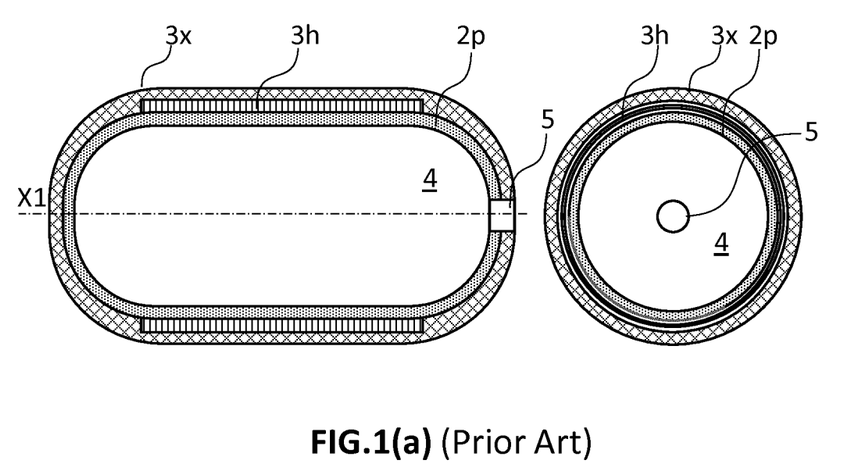

The outer thermoset reinforcing structure provides the strength and stiffness required by the composite pressure vessel for supporting high pressures in the inner cavity. As illustrated in FIG. 1(a), in order to provide the desired mechanical properties, the outer thermoset reinforcing structure comprises continuous reinforcing fibres arranged according to a specific pattern, generally including,

- a fraction of fibres 3h arranged in a hoop direction, i.e., arranged with an angle comprised between 80 and 100° with respect to the longitudinal axis, X1, and
- a fraction of fibres 3x arranged in a helical direction, i.e., arranged with an angle comprised between 10 and 70° with respect to the longitudinal axis, X1.

The reinforcing fibres are embedded in a thermoset matric to form a continuous fibre reinforced thermoset composite;

The outer thermoset reinforcing structure can be wrapped over the inner liner by different techniques, including the following methods. The outer thermoset reinforcing structure can be applied by filament winding (FW) or tape winding (TW) (herein referred to in combination as "filament winding", including both filament and tape winding) by winding a bundle or a tape of reinforcing fibres impregnated with a thermosetting resin in a liquid state, to form an outer shell of a fibre reinforced thermoset composite upon solidification of the polymer matrix. The winding angles can be controlled very accurately, as well known in the art, with fractions of fibre bundles or tapes being arranged in a hoop direction and another fraction of fibres arranged helically.

Alternatively, a braided preform can be formed or inserted over an inner liner and impregnated with a liquid thermosetting resin by an infusion technique, such as resin transfer moulding (RTM), or vacuum infusion process (VIP). This technique has the advantage of being faster than filament winding, but the crimping or waviness of the braided fibres is detrimental to the strength and stiffness of the final composite.

Figure 1B:
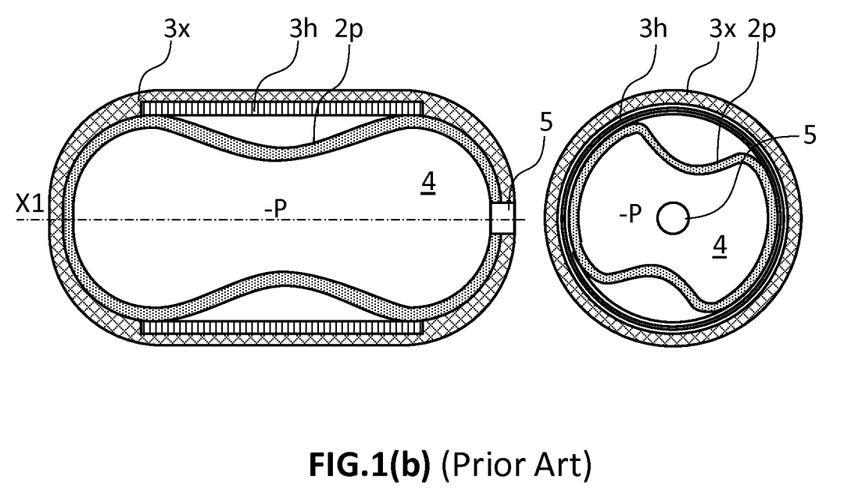

Regardless of the technique used to manufacture a composite pressure vessel, a phenomenon that can irreversibly ruin a composite vessel has been observed in case of sudden loss of pressure inside the pressure vessel. In some cases, as illustrated in FIG. 1(b), the inner liner, under the action of a loss of pressure caused e.g., by a rapid discharge of the pressurized fluid, may delaminate from the outer thermoset reinforcing structure and collapse. The collapse of the inner liner may cause irreversible damages, such as ripping or puncturing of the inner liner. In this case, the composite pressure vessel is ruined and cannot be fixed and must be replaced. This phenomenon is magnified in cases wherein pressurized gas permeates through the wall of the inner liner and lodges at the interface between the inner liner and the outer thermoset reinforcing structure, thus substantially increasing the pressure difference across the inner liner wall, and increasing the risk of delamination accordingly.

The present invention proposes a solution to the problem of delamination and collapse of an inner liner in case of sudden loss of pressure in a composite pressure vessel. This and other advantages of the present invention are explained more in details in the following sections.

SUMMARY OF THE INVENTION

The appended independent claims define the present invention. The dependent claims define preferred embodiments. In particular, the present invention concerns a composite pressure vessel comprising, (a) A body comprising an inner liner which comprises a cylindrical portion extending along a longitudinal axis, X1, and which is made of a thermoplastic polymer material, and (b) An outer thermoset reinforcing structure wrapped around the body and made of a continuous fibre reinforced thermoset matrix composite, comprising reinforcing fibres and a thermoset matrix, Characterized in that, the body further comprises a thermoplastic reinforcement layer made of a continuous fibre reinforced thermoplastic composite, comprising reinforcing fibres and a thermoplastic matrix, which is adhered to the cylindrical portion of the inner liner.

The thermoplastic reinforcement layer comprises a thermoplastic matrix of a polymer family which can be same as or different from the polymer family of the thermoplastic polymer material forming the inner liner. Both polymer families can be selected from the group of polyolefins, polyamides, polyesters, polyurethanes, polycarbonates, polyaryletherketone. The polymer family of the thermoplastic matrix should be adhesively compatible with the polymer family of the thermoplastic polymer material forming the inner liner Two thermoplastics can be considered as being adhesion compatible, if the thermoplastic of the inner liner has a dispersive component, $x_{2p}{}^d = \gamma_{2p}{}^d/\gamma_{2p}$, and the thermoplastic matrix of the thermoplastic reinforcement layer has a dispersive component, $x_{2c}{}^d = \gamma_{2c}{}^d/\gamma_{2c}$, wherein $x_{2p}{}^d = x_{2c}{}^d \times (1 \pm \varepsilon)$, with $\varepsilon=0.2$, preferably $\varepsilon=0.15$, more preferably, $\varepsilon=0.1$, and wherein $\gamma_{2p}$, $\gamma_{2c}$ are the surface energies, and $\gamma_{2p}^d$, $\gamma_{2c}^d$, the dispersive surface energies of the thermoplastic of the inner liner 2p and of the thermoplastic matrix of the thermoplastic reinforcement layer 2c, respectively. This condition explains why best adhesion occurs between same or at least similar polymers.

The thermoplastic reinforcement layer can be selected among,
- a filament or tape wound or placed structure with the reinforcing fibres arranged with an angle comprised between 80 and 100° with respect to the longitudinal axis, X1, or
- a structure wherein the reinforcing fibres form a braid or a weave.

The outer thermoset reinforcing structure can be selected among,
- a filament or tape wound or placed structure wherein, at least a fraction of the reinforcing fibres is arranged helically with an angle comprised between 5 and 79° with respect to the longitudinal axis, X1 and optionally another fraction of the reinforcing fibres is arranged with an angle comprised between 80 and 100° with respect to the longitudinal axis, X1, or
- a structure wherein the reinforcing fibres form a braid or a weave.

The inner liner may comprise a binding layer sandwiched between the inner liner and the thermoplastic reinforcement layer, for enhancing the adhesion of the thermoplastic reinforcement layer with the inner liner.

The present invention also concerns a process for producing a composite pressure vessel as described supra, comprising the following steps:
(a) Providing an inner liner made of a thermoplastic polymer material and comprising a cylindrical portion extending along a longitudinal axis, X1,
(b) Wrapping a thermoplastic reinforcement layer over the cylindrical portion of the inner liner, wherein the thermoplastic reinforcement layer is made of a continuous fibre reinforced thermoplastic composite comprising continuous reinforcement fibres embedded in a thermoplastic matrix,
(c) solidifying the thermoplastic matrix to form a continuous fibre reinforced thermoplastic composite adhered to the cylindrical portion of the inner liner, and thus forming a body,
(d) Wrapping an outer thermoset reinforcing structure made of a continuous fibre reinforced thermoset matrix composite over the body to form the composite pressure vessel.

In a first embodiment, the thermoplastic reinforcement layer can be applied in the form of a preform selected from,
- a towpreg, wherein unidirectional continuous reinforcing fibres and solid thermoplastic discrete particulate in the form of fibres or powder are in intimate contact, or
- a prepreg, wherein unidirectional continuous reinforcing fibres are embedded in a solid continuous thermoplastic matrix, and wherein the thermoplastic is heated above a melting temperature or a softening temperature to form a heated towpreg or prepreg with molten or softened thermoplastic, prior to winding or placing the heated towpreg or prepreg over the cylindrical portion of the inner liner, with application of a pressure in order to drive the impregnation of the fibres by the molten or softened thermoplastic.

In a second embodiment, the thermoplastic reinforcement layer can be applied with the following steps, Wrapping the inner liner with a fabric obtained by braiding, weaving, or winding towpregs to form a wrapped liner, wherein the towpregs include unidirectional continuous reinforcing fibres in intimate contact with solid thermoplastic discrete particulate in the form of fibres or powder, Heating the thus wrapped fabric to melt the thermoplastic discrete particulate of the towpregs, Blowing pressurized gas inside the inner liner with the wrapped liner positioned in a mould cavity to press the fabric and drive an impregnation of the reinforcing fibres by the thus molten thermoplastic, Cooling the fabric to solidify the thermoplastic matrix.

In a third embodiment, the thermoplastic reinforcement layer can be applied by filament or tape winding or placement by passing a bundle or a tape of continuous reinforcing fibres through a reactive thermoplastic precursor for impregnating the reinforcing fibres and winding or placing the thus impregnated reinforcing fibres 10i about the cylindrical portion of the inner liner and applying the process conditions required for the reactive composition to form a thermoplastic matrix.

The thermoplastic reinforcement layer preferably comprises fibres arranged with an angle comprised between 80 and 100° with respect to the longitudinal axis, X1.

The outer thermoset reinforcing structure can be applied by filament or tape winding or placement of reinforcing fibres embedded in a reactive thermoset resin over the thermoplastic reinforcement layer. Alternatively, the outer thermoset reinforcing structure can be applied by wrapping the body with a fabric of braided, woven, or filament wound reinforcing fibres and impregnating the fabric with a thermoset resin, and process conditions are maintained to cross-link the thermoset.

The outer thermoset reinforcing structure preferably comprises at least a fraction of reinforcing fibres arranged helically with an angle comprised between 5 and 79° with respect to the longitudinal axis, X1. Optionally, another fraction of reinforcing fibres can be arranged with an angle comprised between 80 and 100° with respect to the longitudinal axis, X1.

BRIEF DESCRIPTION OF THE FIGURES

For a fuller understanding of the nature of the present invention, reference is made to the following detailed description taken in conjunction with the accompanying drawings in which:

FIG. 1: shows side and front cut views of a prior art composite pressure vessel (a) with an inner liner in operational conditions and (b) with a collapsed inner liner following a drop of pressure inside the inner cavity.

FIG. 2: shows the various layers constituting a pressure vessel according to the present invention; (a) inner liner with (b) thermoplastic reinforcement layer forming a body wrapped in (c) an outer thermoset reinforcing structure.

FIG. 3: shows thermoplastic-fibre towpregs, (a) cross-section of, and transverse cuts of (b) thermoplastic powder impregnated fibres and (c) commingled fibres.

FIG. 4: shows adhering a thermoplastic reinforcement layer to an inner liner by a dry route: (a) filament/tape winding of a thermoplastic-fibre towpreg, (b) placement of a thermoplastic-fibre towpreg, and (c) arranging a thermoplastic-fibre towpreg in the hoop direction over an inner liner.

FIG. 5: shows adhering a thermoplastic reinforcement layer to an inner liner by (a) wrapping a fabric of braided or woven thermoplastic-fibre towpreg over an inner liner, (b) heating the towpregs, and pressurizing the wrapped liner in a mould cavity, and (c) cooling and extracting the body out of the mould cavity.

FIG. 6: shows (a) filament/tape winding of a fibre bundle/tape impregnated with a reactive thermoplastic mixture, and (b) arranging a thermoplastic impregnated fibre bundle/tape in the hoop direction over an inner liner.

FIG. 7: shows wrapping of the body by the outer reinforcement structure by (a) winding over the body a fibre bundle or tape impregnated by a reactive thermoset precursor or (b) by fibre placement of a fibre bundle or tape impregnated by a reactive thermoset precursor, to yield (c) a composite pressure vessel according to the present invention.

FIG. 8: shows wrapping of the body by the outer reinforcement structure by (a) winding a fibre bundle or tape over the body (b) impregnating the fibres by a resin infusion process to yield (c) a composite pressure vessel according to the present invention.

DETAILED DESCRIPTION OF THE INVENTION

The present invention concerns a composite pressure vessel 1 of the type commonly used for storing and delivering a compressed fluid such as, compressed natural gas (CNG), compressed hydrogen gas (CHG), liquefied petroleum gas (LPG), or the like, especially in the field of transportation (ground, air, or water transportation). The composite pressure vessel of the present invention comprises a body 2b comprising an inner liner 2p made of a thermoplastic polymer material such as but not limited to a polyolefin or a polyamide and defining an inner cavity 4 for storing a pressurized fluid. The inner liner 2p comprises a cylindrical portion extending along a longitudinal axis, X1, and is flanked on either side along the longitudinal axis, X1, by a dome shaped end cap closing and defining the inner cavity 4.

In order to resist high pressures in the cavity, the composite pressure vessel comprises an outer thermoset reinforcing structure 3c wrapped around the body. The outer thermoset reinforcing structure is made of a continuous fibre reinforced thermoset matrix composite, comprising reinforcing fibres 11 embedded in a thermoset matrix 13.

Because adhesion between a thermoplastic polymer and a thermoset composite is not necessarily strong, in particular if the inner liner is made of a polyolefin such as high-density polyethylene (HDPE) or polypropylene (PP), the risk of delamination upon a sudden discharge of the pressurized fluid out of the pressure vessel. The risk of delamination is particularly strong with pressurized gases composed of small molecules capable of permeating through the wall of the inner liner and lodging at the interface between the inner liner and the outer thermoset reinforcing structure.

When efforts in the art for solving this problem have concentrated on enhancing the adhesion between the inner liner and the outer thermoset reinforcing structure, e.g., by treating the outer surface of the liner by plasma or the like, with limited success to date, the gist of the present invention is not attempting to improve such adhesion, but to reinforce the body 2b. The body 2b of the composite pressure vessel of the present invention further comprises a thermoplastic reinforcement layer 2c made of a continuous fibre reinforced thermoplastic composite, comprising reinforcing fibres 11 and a thermoplastic matrix 12, which is adhered to the cylindrical portion of the inner liner.

In the present document, the following expressions are given the following meanings, which are according to, or at least perfectly compatible with the generally recognized definitions thereof.

"(continuous) fibre reinforced thermoset/thermoplastic composite" is a composite material comprising continuous reinforcing fibres, such as carbon fibres (CF), glass fibres (GF), or aramid fibres (AF), embedded in a polymeric matrix of a thermoset/thermoplastic polymer.

"continuous fibre" applies to endless fibres, but also to any fibre having an average length greater than 80 mm. This is justified in the art because the full load applied to a composite structure can be transmitted from the polymeric matrix to fibres having a length of at least 80 mm. All reinforcing fibres referred to in the present document are continuous fibres.

"melting temperature" applies to semi-crystalline thermoplastics only and characterizes the temperature above which there are no more crystals, "softening temperature" applies to amorphous thermoplastics and refers to a temperature above which the viscosity of the amorphous thermoplastic is sufficiently low for flowing and impregnating fibres.

"to solidify a thermoplastic" means passing from a flowable liquid state to a non-flowable semi-crystalline solid or a solid amorphous polymer.

"to solidify a thermoset" means passing from a flowable liquid resin to a non-flowable, cured thermoset.

"thermoplastics" or "thermoplastic polymers" or "thermoplastic matrix" area family of polymers that become pliable or mouldable above a specific temperature and solidify upon cooling. They are composed of polymeric chains which are not bound to one another by covalent bonds. The viscosity of thermoplastics, even at elevated temperatures, is generally too high for impregnating a dense bed of reinforcing fibres by techniques usually applied with thermosets, such as resin transfer moulding (RTM) or the like.

"thermoset" or "thermosetting polymer" or "thermosetting matrix" is a family of polymers that are irreversibly cured or crosslinked from a low viscosity resin. The process of curing changes the resin into an infusible polymer network of covalently bonded chains and is induced by the action of heat or suitable radiation often by mixing with a catalyst. The low viscosity of the uncured resins allows the impregnation of dense fibre beds by infusion techniques such as, resin transfer moulding (RTM) or the like.

"prepreg" refers to a tape of continuous reinforcing fibres impregnated with a partially cured thermoset or by a thermoplastic.

"towpreg" refers to a bundle or tape of continuous reinforcing fibres in intimate contact with a solid thermoplastic polymer in a particulate form, such as fibres or powder.

"fabric" is a two-dimensional textile structure made of yarns. It includes inter alia weaves, braids, knits.

"weave" or "woven" is a fabric comprising yarns (called weft) interlacing a series of parallel yarns (called warp), normal to the weft yarns. The pattern of the interlacing can vary to form plain cloth, twill, satin, and the like. A weave has limited drapability to adapt to double curvature geometries.

"braids" are obtained by interlacing three or more yarns such that they cross one another in a diagonal formation. There are flat braids, tubular braids (sleeves) and through the thickness 3D-braids. The drapability of braids is generally superior to the one of weaves.

Body—Inner Liner 2p

The inner liner 2p is made of an unreinforced thermoplastic polymer, which should be substantially impervious to the fluid it is designed to store at the storage pressures. Full imperviousness is not always possible to achieve for all fluids with the problems discussed supra of migration of pressurized gas at the interface formed between the inner liner and the reinforcing structure. Preferred thermoplastics include:
- polyolefins such as (high-density) polyethylene ((HD)PE), polypropylene (PP),
- polyamides such as PA6, PA66, PA12,
- polyesters such as polyethylene terephthalate (PET) polyethylene naphthalate (PEN),
- polyurethanes,
- polycarbonates,
- polyaryletherketone such as PEEK, PEK, PEKK, PEEKK, PEKEKK.

A gas barrier material can be included in the inner liner to enhance imperviousness to specific gases.

Figure 2A:
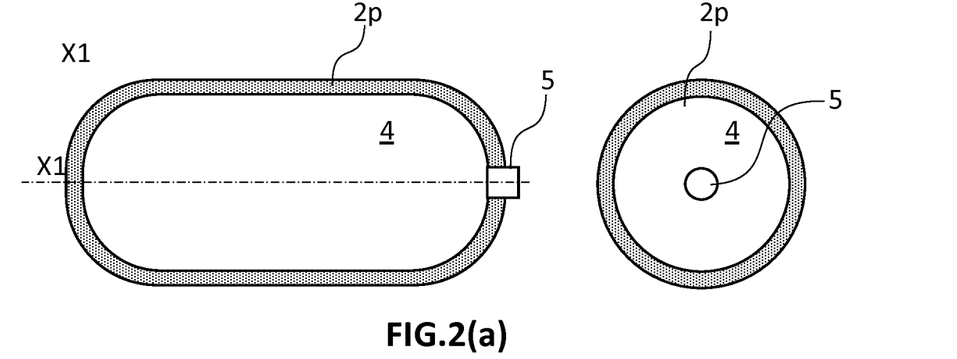
Figure 2B:
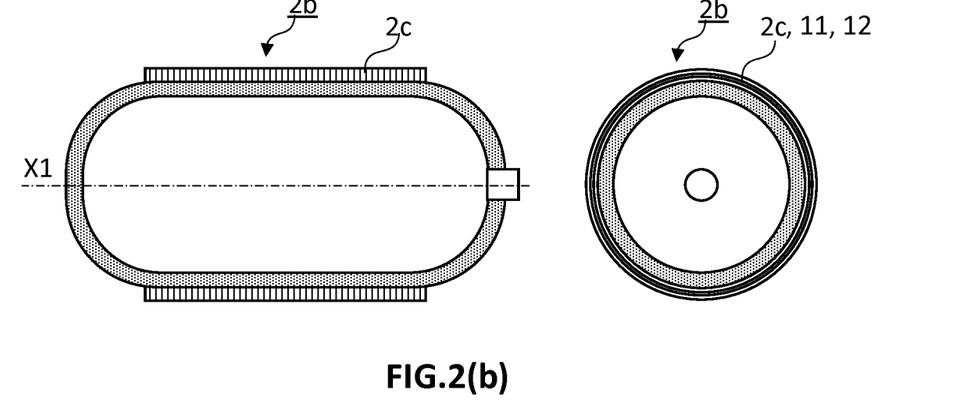
Figure 2C:
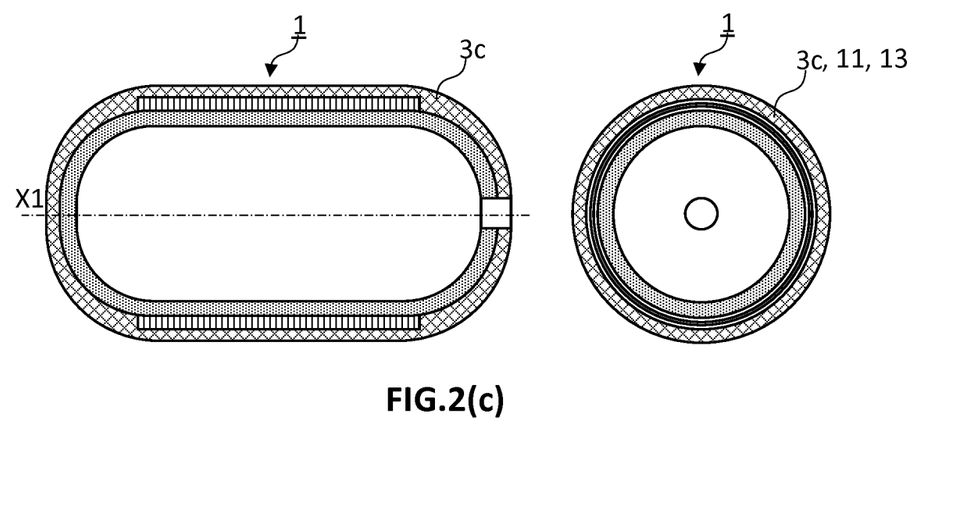

The inner liner 2p defines a hollow body with a cavity 4 comprising a substantially cylindrical portion closed at both ends by dome shaped caps. It comprises at least one opening 5 equipped with appropriate connections for fluidly connecting the interior of the cavity with a system of tubing and valves (not shown in the Figures). The at least one opening is generally centred on one (or both) of the dome shaped caps along the longitudinal axis, X1. In FIG. 2(a) an inner liner 2p with a single opening 5 is illustrated. The inner liner can be produced by rotomoulding, but it is preferably produced by blow-moulding an injection moulded preform or an extruded parison.

Body—Thermoplastic Reinforcement Layer 2c

The thermoplastic reinforcement layer 2c is a part of the body. It is used for reinforcing the inner liner against collapsing in case of a sudden depressurization of the cavity. It is adhered at least to the cylindrical portion of the inner liner. Indeed, because of the single curvature of the cylindrical portion of the inner liner, it is more prone to flexural deformation and collapse than the more structurally stable double curvature dome shaped caps. Depending on the application, the continuous reinforcing fibres of the thermoplastic reinforcement layer can be carbon fibres (CF), glass fibres (GF), or aramid fibres (AF).

In one embodiment, at least a fraction of the continuous reinforcing fibres 11 of the thermoplastic reinforcement layer 2c are arranged with an angle comprised between 80 and 100° with respect to the longitudinal axis, X1. Such arrangement is referred to as hoop direction. The reinforcing fibres in the hoop direction are particularly useful to increase the resistance of the pressure vessel to high pressures in the cavity. They, however, also considerably stiffen the inner liner against collapse by compression.

Alternatively, or concomitantly, the thermoplastic reinforcement layer 2c can comprise at least a portion of the reinforcing fibres arranged in a weave or a braid. The continuous reinforcing fibres in the braid are generally arranged helically. If a weave is used, the orientation of the continuous reinforcing fibres depends on the orientation of the fabric. The weave can be wrapped about the cylindrical portion of the inner liner with the warp yarns parallel (or normal) to the longitudinal axis, X1, resulting in the weft fibres being arranged in the hoop direction. Alternatively, the weave can be wrapped at an angle with the longitudinal axis, X1, resulting in helically arranged fibres. Because of the waviness of the interlaced fibres, the strengthening and stiffening of the inner liner achieved with woven or braided fibres is lower than with laminated plies of unidirectional fibres. Manufacturing of the bodies, however, is faster with fabrics.

The thermoplastic matrix of the thermoplastic reinforcement layer 2c can be selected among the group of polyolefins (e.g., (HD)PE, PP), polyamides (e.g., PA6, PA66, PA12), polyesters (e.g., PET, PEN), polyurethanes, polycarbonates, polyaryletherketone (e.g., PEEK, PEK, PEKK, PEEKK, PEKEKK). The thermoplastic matrix should be selected such that the adhesion to the thermoplastic of the inner liner 2p is sufficiently strong for the desired applications of the composite pressure vessel. Compatibility tests can be carried out, e.g., by peel tests to determine adhesion compatible couples of thermoplastic polymers for forming a strong enough bond between the inner liner and the thermoplastic matrix of the thermoplastic reinforcing layer. The strongest bonds are generally formed by thermoplastics of same chemistry, i.e., using the same polymers or at least the same polymer families.

When different thermoplastics are used for the inner liner and the thermoplastic matrix, selection of adhesion compatible pairs of thermoplastics must take into consideration that when contacting each other, the thermoplastic matrix forms a liquid phase wetting a solid surface of the thermoplastic of the inner liner. There is general agreement in the art, that a high solid surface energy, $\gamma s$, of the solid surface enhances wetting of a liquid material having a lower liquid surface energy, $\gamma l$, and adhesion of the two thermoplastics after solidification of the liquid phase (=thermoplastic matrix). Furthermore, a match between the dispersive component, $x^d = \gamma^d/\gamma$, and polar component, $x^p = \gamma^p/\gamma$, of the solid and liquid phases also enhances wetting between the liquid and solid surfaces and adhesion after solidification of the liquid phase. The surface tensions, $\gamma$, and polar and dispersive components, xp, xd, of polymers are available in textbooks. For example, Table 1 gives the values of the surface energy, $\gamma$, the dispersive and polar surface energies, $\gamma^d$, $\gamma^p$, and of the dispersive and polar components, $x^d$, $x^p$, of a series of thermoplastics.

TABLE 1 surface energy, dispersive and polar energies and components of thermoplastics

| thermoplastic | $\gamma s$ mJ/m$^2$ | $\gamma^d$ mJ/m$^2$ | $\gamma^p$ mJ/m$^2$ | $x^d$, % | $x^p$, % |
|---|---|---|---|---|---|
| Polyethylene-linear (PE) | 35.7 | 35.7 | 0 | 100% | 0% |
| Polyethylene-branched (PE) | 35.3 | 35.3 | 0 | 100% | 0% |
| Polypropylene-isotactic (PP) | 30.1 | 30.1 | 0 | 100% | 0% |
| Polyamide-6,6 (PA-66) | 46.5 | 32.5 | 14 | 70% | 30% |
| Polyamide-12 (PA-12) | 40.7 | 35.9 | 4.9 | 88% | 12% |
| Polyethylene terephthalate (PET) | 44.6 | 35.6 | 9 | 80% | 20% |
| Polycarbonate (PC) | 34.2 | 27.7 | 6.5 | 81% | 19% |
| Polyetheretherketone (PEEK) | 42.1 | 36.2 | 5.9 | 86% | 14% |
| Polyvinylchloride (PVC) | 41.5 | 39.5 | 2 | 95% | 5% |

A relatively low surface energy and a zero-polar component explains why polyolefins are difficult to adhere to many materials. Polyvinylchloride (PVC) has a surface energy of about 42 mJ/m$^2$ with a dispersive component, $x^d = 5\%$, seems the most promising candidate to form an adhesion compatible pair with a polyolefin, although the adhesion will be lower than with more polar thermoplastic pairs, such as PA12 with PET.

As a rule of thumb, two thermoplastics can be considered as adhesion compatible, if the thermoplastic of the inner liner has a dispersive component, $x_{2p}^d = \gamma_{2p}^d/\gamma_{2p}$, and the thermoplastic matrix of the thermoplastic reinforcement layer has a dispersive component, $x_{2c}^d = \gamma_{2c}^d/\gamma_{2c}$, wherein $x_{2p}^d = x_{2c}^d \times (1 \pm \varepsilon)$, with $\varepsilon = 0.2$, preferably $\varepsilon = 0.15$, more preferably, $\varepsilon = 0.1$, and wherein $\gamma_{2p}$, $\gamma_{2c}$ are the surface energies, and $\gamma_{2p}^d$, $\gamma_{2c}^d$, the dispersive surface energies of the thermoplastic of the inner liner 2p and of the thermoplastic matrix of the thermoplastic reinforcement layer 2c, respectively.

In cases where two thermoplastics which are not sufficiently adhesion compatible for a given application are selected as thermoplastic matrix of the thermoplastic reinforcement layer and as thermoplastic of the inner liner, a binding layer 2a (not shown in the Figures) can be applied to an outer surface of the cylindrical portion of the inner liner. For example, tie layers easily available on the market and commonly used in coextrusion of poorly compatible thermoplastic layers can be used as binding layer for enhancing the adhesion between poorly compatible thermoplastics such as a polyolefin coupled to a polyamide or a polyester. Examples of tie layers include ethylene vinyl acetate (EVA), ethylene methyl acrylate (EMA), acid modified olefin copolymers like ethylene acrylic acid (EAA) and ethylene methacrylic acid (EMAA) and ethylene-grafted-maleic anhydride (AMP). Anhydride modified polyethylene is frequently employed when polyolefins have to be bonded to polyamides or to ethylene vinyl alcohol copolymers (EVOH) as it reacts with amine end groups to form imides and with alcohols to form ester crosslinks. AMP's can also be used to improve adhesion of polyolefins with PET and PVDC.

Ideally, the adhesion between the inner liner and the thermoplastic reinforcement layer could be such that delamination involves cohesive fracture, i.e., the crack propagates across the interface, and not (only) along the interface. Cohesive fracture was observed when a same thermoplastic was used both for the inner liner and the matrix of the thermoplastic reinforcement layer.

Outer Thermoset Reinforcing Structure 3c

Like in composite pressure vessels of the prior art, the outer thermoset reinforcing structure 3c of the composite pressure vessels of the present invention provides the required vessel strength and stiffness to resist the inner pressure of the pressurized fluid contained in the cavity. The adhesion of the body to the thermoplastic reinforcement layer 2c needs not be optimized since the outer thermoset reinforcing structure provides the resistance to pressure applied to the walls of the inner liner from the inside of the cavity towards the outside, thus pressing the body against the outer thermoset reinforcing structure which forms an outer shell. In case of depression inside the cavity, the body is sufficiently rigid to not collapse thanks to the thermoplastic reinforcement layer 2c. Although not essential to the present invention, the adhesion between the outer thermoset reinforcing structure 3c and the thermoplastic reinforcing layer can be enhanced by surface treating an outer surface of the body, e.g., by plasma, corona, or the like, or by adding a bonding layer.

The outer thermoset reinforcing structure comprises continuous reinforcing fibres embedded in a thermoset matrix. In a preferred embodiment, at least a fraction of the continuous reinforcing fibres 11 is arranged helically, e.g., by filament or tape winding or placement, over the body 2b with an angle comprised between 5 and 79° with respect to the longitudinal axis, X1. Another fraction of the continuous reinforcing fibres can be arranged in the hoop direction, with an angle comprised between 80 and 100° with respect to the longitudinal axis, X1. This is particularly advantageous in case the thermoplastic reinforcement layer does not comprise any or enough continuous reinforcing fibres arranged in the hoop direction, to ensure an optimal strength of the composite pressure vessel. The orientation angle of the reinforcing fibres is measured at the cylindrical portion of the body 2b.

In an alternative or concomitant embodiment, at least a fraction of the continuous reinforcing fibres is arranged as a woven or braided structure. As discussed supra with respect to the thermoplastic reinforcement layer, the continuous reinforcing fibres can be arranged helically in case of a braided structure or of a woven structure wrapped at an angle with the longitudinal axis, X1. If the thermoplastic reinforcement layer 2c comprises no continuous reinforcing fibres arranged in the hoop direction, it is preferred that the outer thermoset reinforcing structure 3c comprises continuous reinforcing fibres in the hoop direction. If a weave is wrapped with the warp yarns parallel to the longitudinal axis, X1, then the weft fibres are arranged in the hoop direction.

Process

A composite pressure vessel as described supra can be manufactured by a process comprising the following steps:
(a) providing an inner liner 2p made of a thermoplastic polymer material and comprising a cylindrical portion extending along a longitudinal axis, X1,
(b) wrapping a thermoplastic reinforcement layer 2c over the cylindrical portion of the inner liner, wherein the thermoplastic reinforcement layer is made of a continuous fibre reinforced thermoplastic composite comprising continuous reinforcement fibres 11 embedded in a thermoplastic matrix 12,
(c) solidifying the thermoplastic matrix 12 to form a continuous fibre reinforced thermoplastic composite adhered to the cylindrical portion of the inner liner, and thus forming a body 2b, and
(d) wrapping an outer thermoset reinforcing structure 3c made of a continuous fibre reinforced thermoset matrix composite over the body to form the composite pressure vessel.

Process—Thermoplastic Reinforcement Layer 2c

Figure 4A:
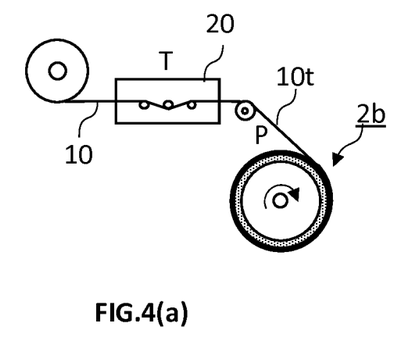
Figure 4B:
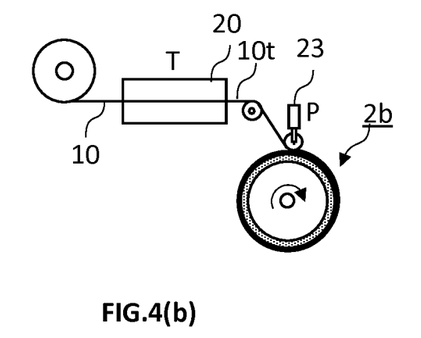
Figure 4C:
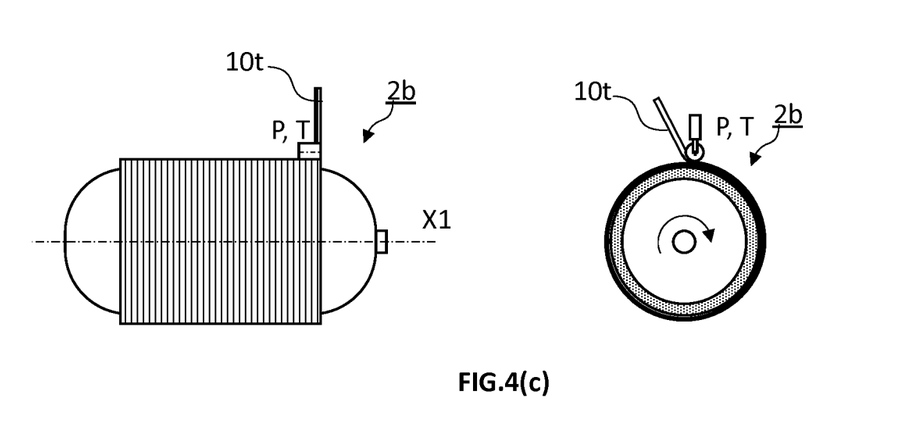
Figure 5A:
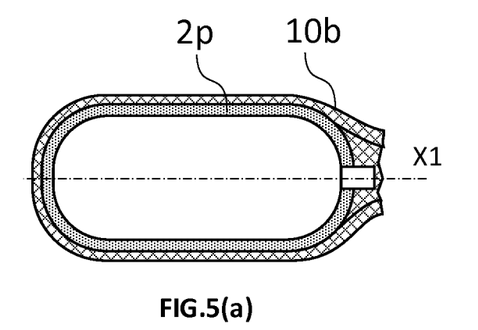
Figure 5B:
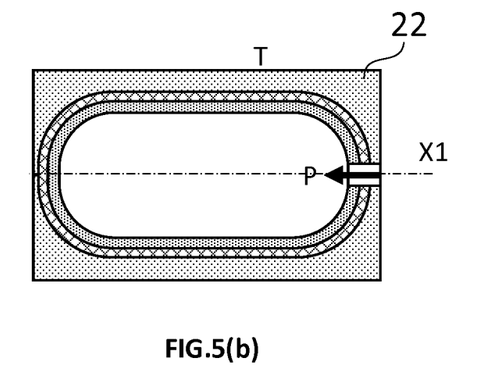
Figure 5C:
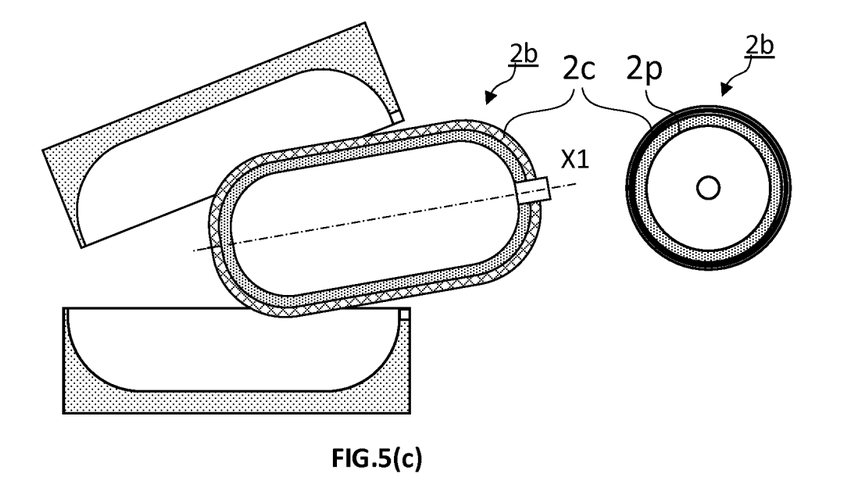
Figure 6A:
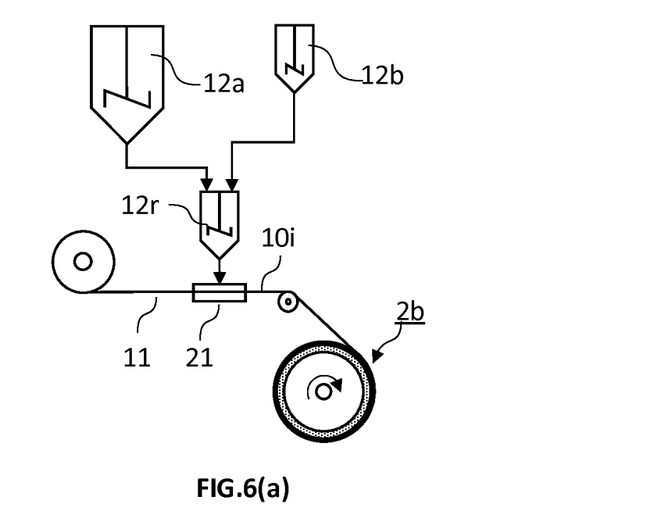
Figure 6B:
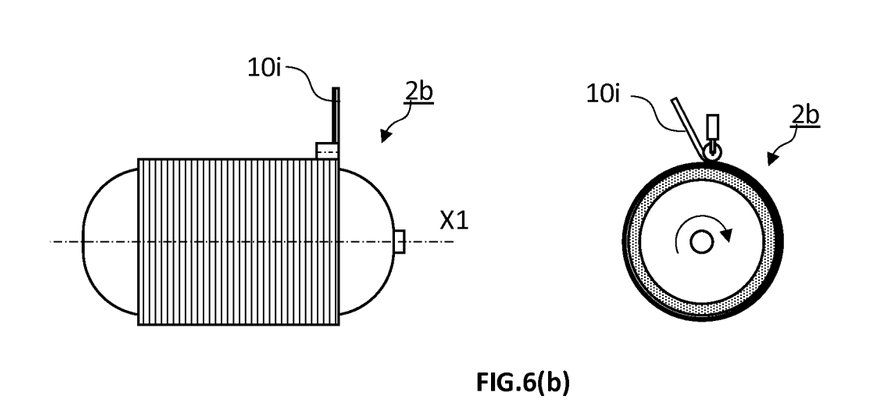

FIGS. 4 to 6 illustrate some techniques for forming a thermoplastic reinforcement layer 2c adhered to the inner liner 2p for forming a body 2b according to the present invention. Two main routes are considered: a dry route (cf. FIGS. 4&5), and a wet route (cf. FIG. 6).

Process—Thermoplastic Reinforcement Layer 2c—Dry Route

The dry route uses towpregs or prepregs. Impregnation of a bed of continuous reinforcing fibres by infusion techniques such as resin injection moulding (RIM), commonly applied with thermosets cannot be used with thermoplastics because of their substantially higher viscosities, slowing impregnation to unsustainable levels. For this reason, thermoplastic towpregs bring in intimate contact reinforcing fibres and solid thermoplastic particulate prior to melting the polymer to shorten the flowing distance a thermoplastic melt must flow to impregnate a bed of reinforcing fibres. A more intimate contact and dispersion of the reinforcing fibres and thermoplastic particulate reduces the flowing distances and accelerates and facilitates fibre impregnation by the thermoplastic melt. Towpregs are very flexible at room temperature and can be transformed into textile fabrics, such as weaves or braids.

Figure 3A:
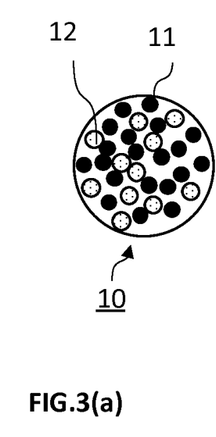
Figure 3B:
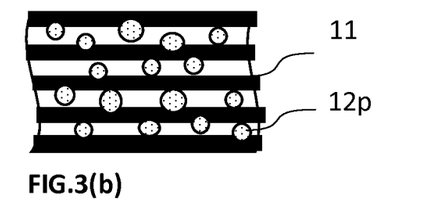
Figure 3C:
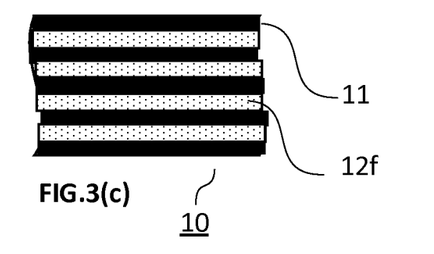

As illustrated in FIG. 3(a), a towpreg is formed of continuous reinforcing fibres 11 distributed in intimate contact with solid thermoplastic discrete particulate 12. As shown in FIGS. 3(b)&(c), the thermoplastic discrete particulate can be in the form of fibres 12f thus forming so-called commingled fibres, or in the form of powder 12p thus forming powder impregnated towpregs. Towpregs are flexible at room temperature and can be transformed into textile fabrics, such as weaves, braids, and the like. The reinforcing fibres of towpregs can be impregnated by heating the thermoplastic particulate above its melting temperature or softening temperature for amorphous thermoplastics. Application of a pressure drives the flow of the molten thermoplastic over the shortened flowing distance required to impregnate the reinforcing fibres and form a thermoplastic composite. Towpregs or fabrics made of towpregs can be transformed into a composite part by a multitude of techniques known in the art, including but not restricted to, compression moulding, bladder moulding, filament (tow) winding or placement, pultrusion, stamping, and the like. When the fibres are impregnated the composite part can be cooled to solidify the thermoplastic.

Prepregs are tapes of continuous reinforcing fibres impregnated by a thermoplastic. Prepregs can be formed from heated towpregs which are continuously run through a pair of cylinders to force the flow of melt. The resulting prepregs are much stiffer at room temperature than towpregs, and their drapability over complex geometries is very limited. An example of commingled yarns can be found in U.S. Pat. No. 5,910,361. Production of thermoplastic prepregs using powder impregnated towpregs is described e.g., in US2001001408.

As shown in FIG. 4(a), a thermoplastic reinforcement layer can be wrapped over the cylindrical portion of the inner liner by heating a towpreg 10 through a furnace 20 above the melting/softening temperature of the thermoplastic matrix, and filament winding the thus heated towpreg 10t with molten thermoplastic (of course, the same process can be performed with prepregs). The tension of the heated towpregs 10t at the contact area with the inner liner must be sufficient to create a pressure required for driving the impregnation of the reinforcing fibres by the thermoplastic melt. Additional pressure can be applied with a roller at the contact area of the towpregs with the inner liner (=roller assisted filament winding). Upon cooling the thermoplastic solidifies thus forming the thermoplastic reinforcement layer 2c. Alternatively, or concomitantly, as illustrated in FIG. 4(a), the towpregs can run over an under a number of rollers located in the furnace 20 to create a pressure driving the impregnation of the fibres in the furnace prior to winding the heated towpreg about the inner liner.

FIG. 4(b) shows wrapping of the inner liner by towpregs placement with a robot arm 23 positioning the two according to a predefined pattern. If, as shown in FIG. 4(c) the pattern is simply arranging fibres in the hoop direction, the tow placement process becomes equivalent to a roller assisted filament winding. Tow placement allows the positioning of a towpreg or a tape according to quite intricate patterns.

FIG. 5 shows an alternative technique for adhering a thermoplastic reinforcement layer 2c to an outer surface of the inner liner 2p. The towpregs can be wrapped over the inner liner in the form of a textile fabric. For example, in the form of a braid or of a weave. FIG. 5(a) illustrates a tubular braid (=sleeve) produced separately with the right dimensions. Because the angle of the fibres within the braided structure can be varied by pulling on the sleeve, the sleeve can be stretched to a larger diameter to fit over the inner liner and released to perfectly mate the geometry of the inner liner. In an alternative embodiment, the towpregs can be braided in situ, directly over the inner liner, to fit perfectly the geometry of the inner liner.

A weave can be wrapped over the cylindrical portion of the inner liner, with a control of the alignment angle of the fibres with respect to the longitudinal axis, X1. For example, the warp yarns can be parallel to the longitudinal axis, X1, and the weft yarns be arranged in the hoop direction. Alternatively, the weave can be wrapped with the fibres at an angle with the longitudinal axis, X1, resulting in helically arranged fibres.

The wrapped fabric is then heated above the melting/softening temperature of the thermoplastic particulate 12 and positioned into a mould cavity. Pressure is applied by blowing a pressurized fluid (e.g., air) into the inner liner, provoking the bulging of the inner liner walls, which press the heated fabric against the walls of the mould cavity. Pressure and temperature must be maintained for a time sufficient to complete impregnation of the reinforcing fibres by the thermoplastic melt. The thermoplastic melt can be cooled to solidify and thus form the thermoplastic reinforcement layer 2c over the inner liner to yield a body 2b which is reinforced and can be extracted from the mould.

In a first alternative, the fabric wrapping the inner liner can be heated either outside the mould cavity, e.g., in an infrared oven and positioned into the mould cavity which is at a lower temperature. In a second alternative, the wrapped liner can be positioned into a heated mould cavity which is thereafter cooled to solidify the thermoplastic. The first alternative yields generally shorter and cheaper process cycles, because the mould needs not be heated and cooled intermittently, but the risk of an incomplete impregnation of the reinforcing fibres is high due to the drop of temperature of the thermoplastic melt during impregnation in the mould cavity. The second option guarantees the conditions for optimizing impregnation of the reinforcing fibres at the expenses of a longer and more expensive process cycle, because the mould must be heated above the melting temperature and cooled below the solidifying temperature at each cycle.

Process—Thermoplastic Reinforcement Layer 2c—Wet Route

As illustrated in FIG. 6(a), some thermoplastics can be produced in situ from a reactive thermoplastic system by mixing a thermoplastic precursor 12a and a thermoplastic reactive compound 12b to form a thermoplastic reactive precursor 12r and allowing the latter to react to form a thermoplastic. The advantage of such reactive thermoplastics is that the starting components (thermoplastic precursor 12a and thermoplastic reactive compound 12b have a low viscosity, allowing them to be processed like thermosets. An example of such reactive systems includes polymerisation of thermoplastic polyurethanes (TPU) by reaction of a polyol with a polyisocyanate (cf. e.g., U.S. Pat. No. 8,034,873). Another example is polymerization of activated anionic lactam to form polyamides as described, e.g., in U.S. Pat. No. 5,747,634.

As shown in FIG. 6(a), a filament/tape winding set up similar to the ones used for filament winding of thermoset composites can be used to produce the thermoplastic reinforcement layer using a reactive thermoplastic system. A thermoplastic precursor 12a and a thermoplastic reactive compound 12b are stored in appropriate conditions in separate tanks in fluid communication with a mixing chamber. The thermoplastic precursor 12a and the thermoplastic reactive compound 12b are metered into the mixing chamber where they are mixed to form a reactive thermoplastic precursor 12r, which is transferred to an impregnation chamber 21, continuously traversed by a bundle or tape of reinforcing fibres 11. Because the reactive thermoplastic precursor 12r has a low viscosity, impregnation of the running fibres 11 in the impregnation chamber is rapid and easy, thus forming an impregnated fibre bundle/tape 10i which is wound or placed over the inner liner 2p. The reactive thermoplastic precursor 12r is allowed to react to form a thermoplastic reinforcement layer 2c adhered to the inner liner, and together forming the body 2b of the composite pressure vessel of the present invention.

Process—Outer Thermoset Reinforcing Structure 3c

The outer thermoset reinforcing structure 3c comprises reinforcing fibres embedded in a thermoset matrix as is commonly used in the art of composite pressure vessels. It can be applied by any technique known in the art. In particular, the outer thermoset reinforcing structure can be applied by a winding or placement process or by an infusion process.

Process—Outer Thermoset Reinforcing Structure 3c—Winding/Placement

Figure 7A:
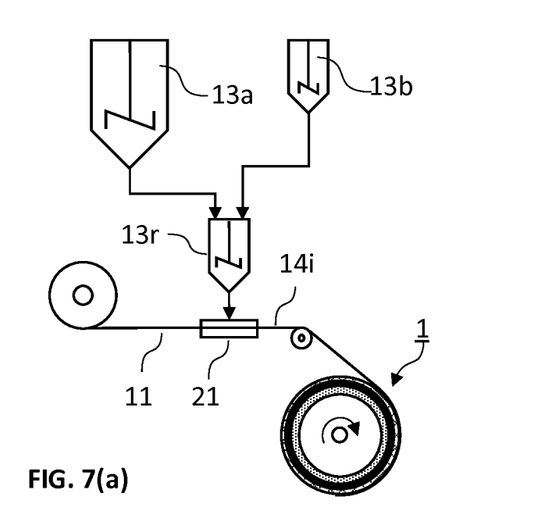
Figure 7B:
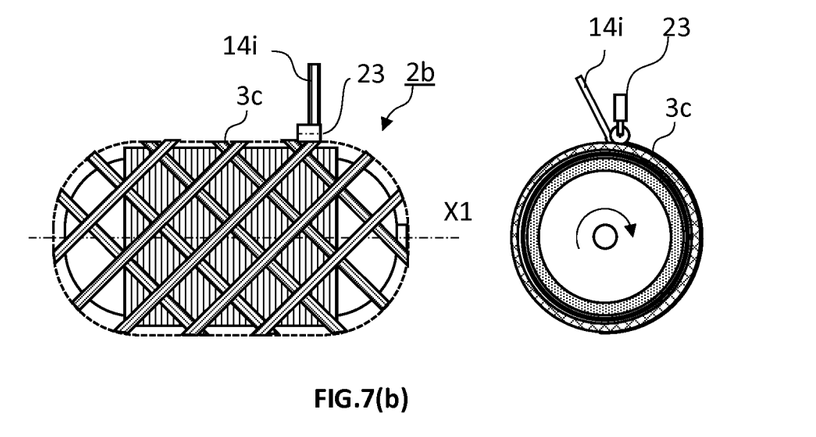
Figure 7C:
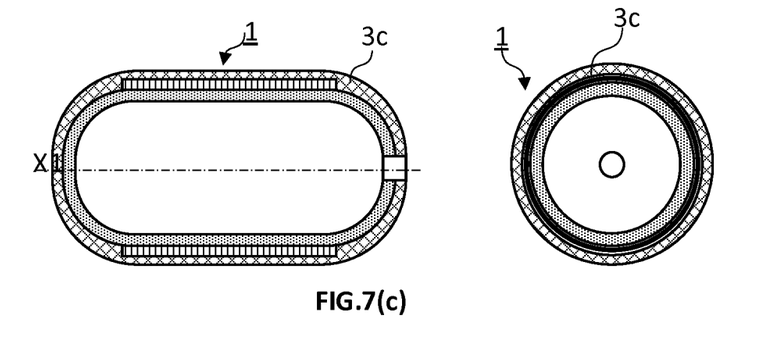

FIG. 7 illustrates a winding process of a thermoset composite, wherein the outer thermoset reinforcing structure 3c is applied by filament or tape winding or placement of reinforcing fibres embedded in a reactive thermoset resin over the thermoplastic reinforcement layer 2c. A thermoset precursor 13a and a reactive thermoset compound 13b are stored in appropriate conditions in separate tanks in fluid communication with a mixing chamber. The thermoset precursor 13a and the thermoset reactive compound 13b are metered into a mixing chamber where they are mixed to form a reactive thermoset precursor 13r, which is transferred to an impregnation chamber 21, continuously traversed by a bundle or tape of reinforcing fibres 11, thus forming an impregnated fibre bundle/tape 14i which is wound or placed over the body 2b. The reactive thermoset precursor 13r is allowed to cure to yield a crosslinked thermoset composite forming the outer thermoset reinforcing structure 3c thus completing the manufacture of the composite pressure vessel of the present invention.

The fibre bundles/tapes can be applied very accurately according to a desired pattern as well known in the art. In case the thermoplastic reinforcement layer 2c comprises no, or few reinforcing fibres arranged in the hoop direction, it is preferred that the outer reinforcing layer 3c comprises a sufficient fraction of reinforcing fibres arranged in the hoop direction for achieving the desired mechanical properties.

Process—Outer Thermoset Reinforcing Structure 3c—Infusion

The outer thermoset reinforcing structure 3c can also be applied in a two-step process comprising: (a) application of a dry reinforcing fibre structure over the body 2b followed by (b) impregnating the dry fibre structure with a reactive thermoset precursor 13r by an infusion technique.

Figure 8A:
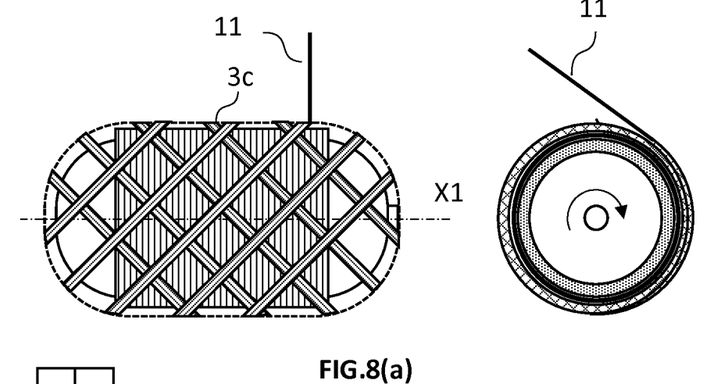

Dry reinforcing fibres (i.e., not impregnated with a resin) can be applied over the body 2b by filament/tape winding or placement (as illustrated in FIG. 8(a)), in situ braiding over the body, wrapping of the body with a fabric such as a braided sleeve or a woven fabric.

Figure 8B:
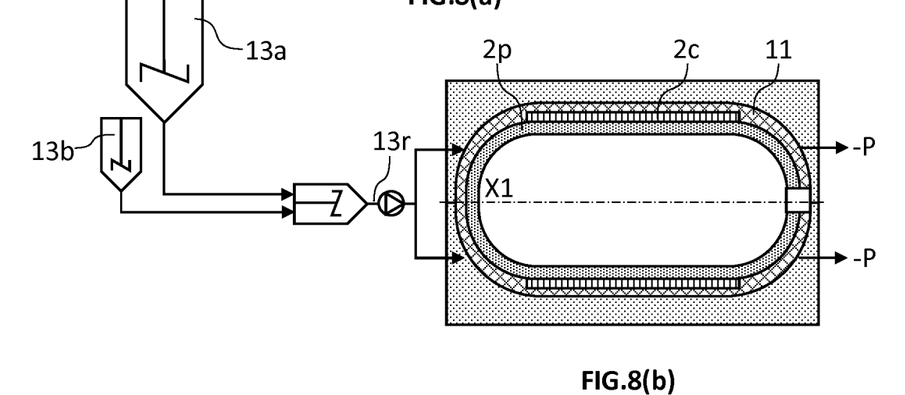

Impregnation of the dry reinforcing fibre structure thus obtained can be carried out by an infusion process, such as resin injection moulding (RIM), resin transfer moulding (RTM), vacuum infusion process (VIP), and the like. As illustrated in FIG. 8(b), resin infusion consists of infusing a reactive thermoset precursor 13r through the dry fibres, with the wrapped body enclosed in a mould cavity or in a vacuum bag. A mould yields a better surface finish than a bag but is of course more expensive. Infusion can be driven by pressurizing the reactive thermoset precursor e.g., with a pump as shown in FIG. 8(b) as applied in RIM. Alternatively, or additionally, infusion can be driven by drawing a vacuum within the dry fibres enclosed in the mould cavity or the vacuum bag. Vacuum alone is used in RTM, and both pressurization and vacuum are used in so called vacuum assisted RIM, as illustrated in FIG. 8(b).

Figure 8C:
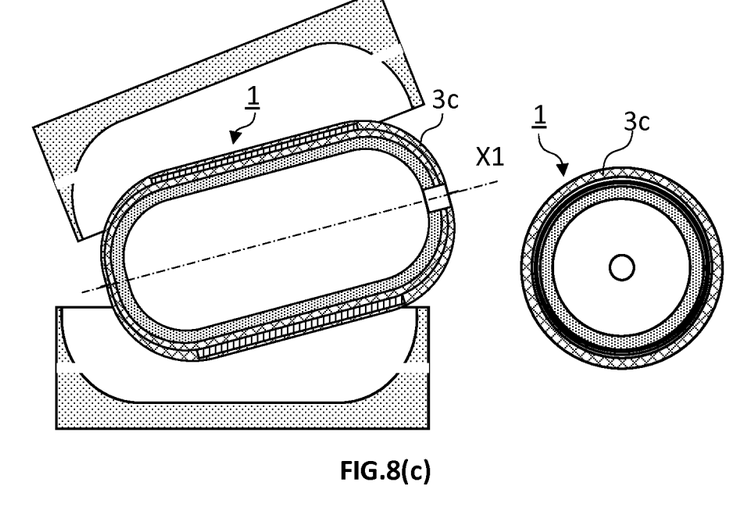

The process conditions required for crosslinking the reactive thermoset precursor must be maintained for a time sufficient to complete the curing and to yield a thermoset composite forming the outer reinforcement structure (cf. FIG. 8(c)).

The present invention therefore provides an original solution to the problem of collapsing inner liners, in that no attempt is made to enhance the adhesion between the inner liner and the outer thermoset reinforcing structure, but the problem is solved by reinforcing the inner liner by adhering thereto a thermoplastic reinforcement layer to form a body having sufficient strength and stiffness to not collapse in case of sudden depression inside the cavity 4.

| REF | FEATURE |
|---|---|
| 1 | Composite pressure vessel |
| 2b | Body |
| 2c | Thermoplastic reinforcement layer |
| 2p | Inner liner |
| 3c | Outer thermoset reinforcing structure |
| 3h | Thermoset composite with fibres arranged in hoop direction |
| 3x | Thermoset composite with fibres arranged helically |
| 4 | Inner cavity |
| 5 | Pressure vessel opening |
| 10 | Thermoplastic-fibre towpreg |
| 10b | Braided thermoplastic-fibre towpreg |
| 10i | Fibre bundle/tape impregnated by a reactive thermoplastic precursor |
| 10t | Heated towpreg or prepreg above Tm of thermoplastic |
| 11 | Reinforcing fibres |
| 12 | Thermoplastic |
| 12a | Thermoplastic precursor |
| 12b | Thermoplastic reactive compound |
| 12f | Thermoplastic fibres |
| 12p | Thermoplastic powder |
| 12r | Reactive thermoplastic precursor |
| 13a | Thermoset precursor |
| 13b | Thermoset reactive compound |
| 13r | Reactive thermoset precursor |
| 14i | Fibre impregnated with non-crosslinked thermoset |
| 20 | Heating station |
| 21 | Impregnation chamber |
| 22 | Mould |
| 23 | Placement head for placing a filament/tape/tow |
| P | pressure |
| T | temperature |
| X1 | Longitudinal axis |

The invention claimed is:

1. A composite pressure vessel comprising:
   a body comprising an inner liner which comprises a cylindrical portion extending along a longitudinal axis, and which is made of a thermoplastic polymer material; and
   an outer thermoset reinforcing structure wrapped around the body and made of a continuous fiber reinforced thermoset matrix composite, comprising reinforcing fibers and a thermoset matrix,
   wherein the body further comprises a thermoplastic reinforcement layer made of a continuous fiber reinforced thermoplastic composite, comprising reinforcing fibers and a thermoplastic matrix, which is adhered to the cylindrical portion of the inner liner, wherein the thermoplastic of the inner liner has a dispersive component, $X_{2p}^d = \gamma_{2p}^d/\gamma_{2p}$, and the thermoplastic matrix of the thermoplastic reinforcement layer has a dispersive component, $x_{2c}^d = \gamma_{2c}^d/\gamma_{2c}$, wherein $x_{2p}^d = x_{2c}^d \times (1 \pm \varepsilon)$, wherein $\varepsilon = 0.2$, or $\varepsilon = 0.15$, or $\varepsilon = 0.1$, and Wherein $\gamma_{2p}$, $\gamma_{2c}$ are the surface energies, and $\gamma_{2p}^d$, $\gamma_{2c}^d$, the dispersive surface energies of the thermoplastic of the inner liner and of the thermoplastic matrix of the thermoplastic reinforcement layer, respectively.

2. The composite pressure vessel according to claim 1, wherein the thermoplastic reinforcement layer comprises a thermoplastic matrix of a polymer family which can be same as or different from the polymer family of the thermoplastic polymer material forming the inner liner, and both polymer families are selected from the group of polyolefins, polyamides, polyesters, polyurethanes, polycarbonates, polyaryletherketone, polyvinyl chloride, wherein the polymer family of the thermoplastic matrix is adhesively compatible with the polymer family of the thermoplastic polymer material forming the inner liner.

3. The composite pressure vessel according to claim 1, wherein the thermoplastic reinforcement layer is selected among
a filament or tape wound or placed structure with the reinforcing fibers arranged with an angle comprised between 80° and 100° with respect to the longitudinal axis, or
a structure wherein the reinforcing fibers form a braid or a weave.

4. The composite pressure vessel according to claim 1, wherein the outer thermoset reinforcing structure is selected among
a filament or tape wound or placed structure wherein at least a fraction of the reinforcing fibers is arranged helically with an angle comprised between 5° and 79° with respect to the longitudinal axis and optionally another fraction of the reinforcing fibers is arranged with an angle comprised between 80° and 100° with respect to the longitudinal axis, or
a structure wherein the reinforcing fibers form a braid or a weave.

5. A process for producing the composite pressure vessel according to claim 1, comprising:
providing the inner liner made of a thermoplastic polymer material and comprising the cylindrical portion extending along a longitudinal axis;
wrapping the thermoplastic reinforcement layer over the cylindrical portion of the inner liner, wherein the thermoplastic reinforcement layer is made of the continuous fiber reinforced thermoplastic composite comprising continuous reinforcement fibers embedded in the thermoplastic matrix;
solidifying the thermoplastic matrix to adhere the continuous fiber reinforced thermoplastic composite to the cylindrical portion of the inner liner, and thus forming the body; and
wrapping the outer thermoset reinforcing structure made of the continuous fiber reinforced thermoset matrix composite over the body to form the composite pressure vessel.

6. The process according to claim 5, Wherein the thermoplastic reinforcement layer is applied in the form of a preform selected from
a towpreg, wherein unidirectional continuous reinforcing fibers and solid thermoplastic discrete particulate in the form of fibers or powder are in intimate contact, or
a prepreg, wherein unidirectional continuous reinforcing fibers are embedded in a solid continuous thermoplastic matrix,
and wherein the thermoplastic is heated above a melting temperature or a softening temperature to form a heated towpreg or prepreg with molten or softened thermoplastic, prior to winding or placing the heated towpreg prepreg over the cylindrical portion of the inner liner, with application of a pressure in order to drive the impregnation of the fibers by the molten or softened thermoplastic.

7. The process according to claim 5, wherein the thermoplastic reinforcement layer is applied by
wrapping the inner liner with a fabric obtained by braiding, weaving, or winding towpregs to form a wrapped liner, wherein the towpregs include unidirectional continuous reinforcing fibers intimate contact with solid thermoplastic discrete particulate in the form of fibers or powder,
heating the thus wrapped fabric to melt the thermoplastic discrete particulate of the towpregs,
blowing pressurized gas inside the inner liner with the wrapped liner positioned in a mould cavity to press the fabric and drive an impregnation of the reinforcing fibers by the thus molten thermoplastic, and
cooling the fabric to solidify the thermoplastic matrix.

8. The process according to claim 5, Wherein thermoplastic reinforcement layer is applied by filament or tape winding or placement by passing a bundle or a tape of continuous reinforcing fibers through a reactive thermoplastic precursor for impregnating the reinforcing fibers and winding or placing the thus impregnated reinforcing fibers about the cylindrical portion of the inner liner and applying the process conditions required for the reactive composition to form the thermoplastic matrix.

9. The process according to claim 5, wherein the outer thermoset reinforcing structure is applied by filament or tape winding or placement of reinforcing fibers embedded in a reactive thermoset resin over the thermoplastic reinforcement layer.

10. The process according to claim 5, wherein the outer thermoset reinforcing structure is applied by wrapping the body with a fabric of braided, woven, or filament wound reinforcing fibers and impregnating the fabric with a thermoset resin, and process conditions are maintained to crosslink the thermoset.

11. The process according to claim 5, wherein the thermoplastic reinforcement layer comprises fibers arranged with an angle comprised between 80° and 100° with respect to the longitudinal axis.

12. The process according to claim 5, wherein the outer thermoset reinforcing structure comprises at least a fraction of reinforcing fibers arranged helically with an angle comprised between 5° and 79° with respect to the longitudinal axis and optionally another fraction of reinforcing fibers arranged with an angle comprised between 80° and 100° with respect to the longitudinal axis.

13. A composite pressure vessel comprising:
a body comprising an inner liner which comprises a cylindrical portion extending along a longitudinal axis, and which is made of a thermoplastic polymer material; and
an outer thermoset reinforcing structure wrapped around the body and made of a continuous fiber reinforced thermoset matrix composite, comprising reinforcing fibers and thermoset matrix, wherein the body further comprises a thermoplastic reinforcement layer made of a continuous fiber reinforced thermoplastic composite, comprising reinforcing fibers and a thermoplastic matrix, which is adhered to the cylindrical portion of the inner liner, and wherein the inner liner further comprises a binding layer sandwiched between the inner liner and the thermoplastic reinforcement layer, for enhancing the adhesion of the thermoplastic reinforcement layer with the inner liner.

14. A process for producing the composite pressure vessel according to claim 13, comprising:

providing the inner liner made of a thermoplastic polymer material and comprising the cylindrical portion extending along a longitudinal axis;

wrapping the thermoplastic reinforcement layer over the cylindrical portion of the inner liner, wherein the thermoplastic reinforcement layer is made of the continuous fiber reinforced thermoplastic composite comprising continuous reinforcement fibers embedded in the thermoplastic matrix;

solidifying the thermoplastic matrix to adhere the continuous fiber reinforced thermoplastic composite to the cylindrical portion of the inner liner, and thus forming the body; and wrapping the outer thermoset reinforcing structure made of the continuous fiber reinforced thermoset matrix composite over the body to form the composite pressure vessel.

15. The process according to claim 14, wherein the thermoplastic reinforcement layer is applied in the form of a preform selected from a towpreg, wherein unidirectional continuous reinforcing fibers and solid thermoplastic discrete particulate in the form of fibers or powder are in intimate contact, or a prepreg, wherein unidirectional continuous reinforcing fibers are embedded in a solid continuous thermoplastic matrix, and wherein the thermoplastic is heated above a melting temperature or a softening temperature to form a heated towpreg or prepreg with molten or softened thermoplastic, prior to winding or placing the heated towpreg or prepreg over the cylindrical portion of the inner liner, with application of a pressure in order to drive the impregnation of the fibers by the molten or softened thermoplastic.

16. The process according to claim 14, wherein the thermoplastic reinforcement layer is applied by wrapping the inner liner with a fabric obtained by braiding, weaving or winding towpregs to form a wrapped liner, wherein the towpregs include unidirectional continuous reinforcing fibers in intimate contact with solid thermoplastic discrete particulate in the form of fibers or powder, heating the thus wrapped fabric to melt the thermoplastic discrete particulate of the towpregs, blowing pressurized gas inside the inner liner with the wrapped liner positioned in a mould cavity to press the fabric and drive an impregnation of the reinforcing fibers by the thus molten thermoplastic, and cooling the fabric to solidify the thermoplastic matrix.

17. The process according to claim 14, wherein thermoplastic reinforcement layer is applied by filament or tape winding or placement by passing a bundle or a tape of continuous reinforcing fibers through a reactive thermoplastic precursor for impregnating the reinforcing fibers and winding or placing the thus impregnated reinforcing fibers about the cylindrical portion of the inner liner and applying the process conditions required for the reactive composition to form the thermoplastic matrix.

18. The process according to claim 14, wherein the outer thermoset reinforcing structure is applied by filament or tape winding or placement of reinforcing fibers embedded in a reactive thermoset resin over the thermoplastic reinforcement layer.

19. The process according to claim 14, wherein the outer thermoset reinforcing structure is applied by wrapping the body with a fabric of braided, woven, or filament wound reinforcing fibers and impregnating the fabric with a thermoset resin, and process conditions are maintained to cross-link the thermoset.

20. The process according to claim 14, wherein the thermoplastic reinforcement layer comprises fibers arranged with an angle comprised between 80° and 100° with respect to the longitudinal axis.

21. The process according to claim 14, wherein the outer thermoset reinforcing structure comprises at least a fraction of reinforcing fibers arranged helically with an angle comprised between 5° and 79° with respect to the longitudinal axis and optionally another fraction of reinforcing fibers arranged with an angle comprised between 80° and 100° with respect to the longitudinal axis.

\* \* \* \* \*